(No Model.)
H. HENRICH.
FINGER RING.
No. 274,193. Patented Mar. 20, 1883.
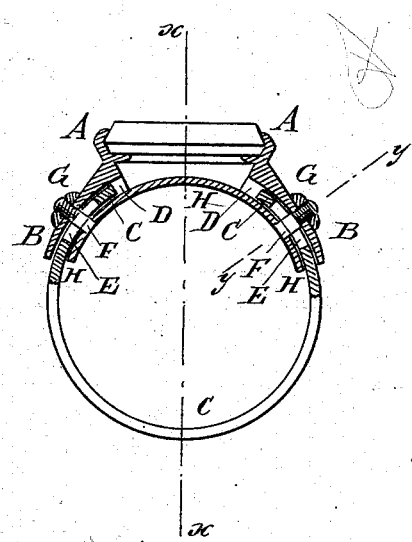
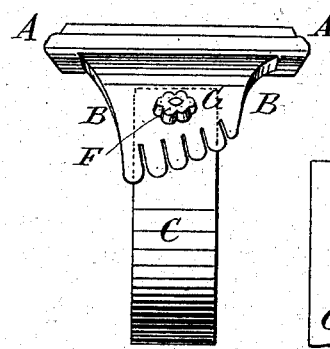
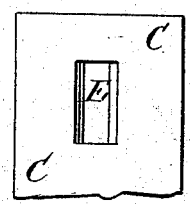
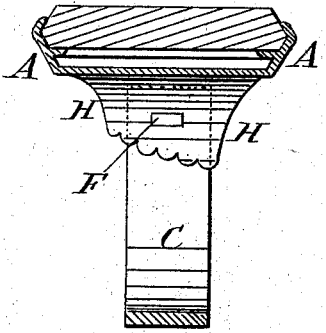
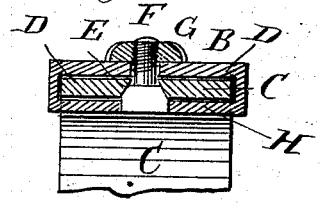
WITNESSES:
Chas. Nida
C. Sedgwick
INVENTOR:
H. Henrich
BY Munn & Co
ATTORNEYS.

UNITED STATES PATENT OFFICE.

HEINRICH HENRICH, OF NEW YORK, N. Y., ASSIGNOR TO ROSA HENRICH, OF SAME PLACE.

FINGER-RING.

SPECIFICATION forming part of Letters Patent No. 274,193, dated March 20, 1883.

Application filed January 29, 1883. (No model.)

*To all whom it may concern:*

Be it known that I, HEINRICH HENRICH, of the city, county, and State of New York, have invented a new and useful Improvement in Finger-Rings, of which the following is a full, clear, and exact description.

Reference is to be had to the accompanying drawings, forming a part of this specification, in which similar letters of reference indicate corresponding parts in all the figures.

Figure 1 is a sectional elevation of my improvement. Fig. 2 is a side elevation of the same. Fig. 3 is a sectional side elevation of the same, taken through the line $x\ x$, Fig. 1. Fig. 4 is a sectional plan view of a part of the same, taken through the line $y\ y$, Fig. 1; and Fig. 5 is a side elevation of one end of the shank.

My invention relates to improvements in that class of finger-rings which are adapted to be adjusted to fit different-sized fingers.

The invention consists in a finger-ring having the side pieces of its head grooved on the inner side and a separable shank provided with slots in ends, having beveled edges and secured in the grooves of the side pieces by bolts and nuts, as hereinafter fully described, and pointed out in the claim.

A represents the head, B the side pieces, and C the shank, of a ring. In the inner sides of the side pieces, B, are formed grooves D, of such a width and depth as to receive the ends of the shank C, which ends have longitudinal slots E formed in them to receive the bolts F. The bolts F are made square or are flattened, to prevent them from turning in the shank C, pass through holes in the side pieces, B, and have nuts G screwed upon their ends. The side edges of the heads of the bolts F and the side edges of the slots E are beveled, as shown in Figs. 4 and 5, so that the ends of the shank C can be firmly clamped to the side pieces, B, by tightening the nuts G of the said bolts F. By preference a plate, H, is secured to the inner sides of the side pieces, B, to cover the grooves D in the said side pieces and the slotted ends of the shank C, as shown in Figs. 1, 3, and 4. The plate H is, however, not essential, and can be dispensed with.

Having thus described my invention, I claim as new and desire to secure by Letters Patent—

In a finger-ring, the combination, with the shank C, provided with the slots E in its ends, having beveled edges, of the side pieces, B, of the head A, provided with the grooves D to receive the ends of the shank, the screws F, having beveled heads, and the nuts G, substantially as herein shown and described.

HEINRICH HENRICH.

Witnesses:
 JAMES T. GRAHAM,
 C. SEDGWICK.